United States Patent
Yee et al.

(10) Patent No.: US 12,554,288 B2
(45) Date of Patent: Feb. 17, 2026

(54) BISTABLE HINGE WITH DETERMINANT MOTION

(71) Applicant: Microsoft Technology Licensing, LLC, Redmond, WA (US)

(72) Inventors: Christina Ashley Yee, Redmond, WA (US); Joseph Benjamin Gault, Seattle, WA (US); Brian David Bitz, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 534 days.

(21) Appl. No.: 17/914,640

(22) PCT Filed: Mar. 25, 2020

(86) PCT No.: PCT/US2020/024700
§ 371 (c)(1),
(2) Date: Sep. 26, 2022

(87) PCT Pub. No.: WO2021/194485
PCT Pub. Date: Sep. 30, 2021

(65) Prior Publication Data
US 2023/0123520 A1    Apr. 20, 2023

(51) Int. Cl.
*G06F 1/16* (2006.01)
*H04M 1/02* (2006.01)

(52) U.S. Cl.
CPC ........... *G06F 1/1681* (2013.01); *G06F 1/162* (2013.01); *H04M 1/0222* (2013.01); *G06F 1/1616* (2013.01)

(58) Field of Classification Search
CPC ..... G06F 1/1681; G06F 1/162; H04M 1/0222
See application file for complete search history.

(56) References Cited

U.S. PATENT DOCUMENTS 5,489,924 A * 2/1996 Shima ..................... G06F 1/162
                                                       345/905
5,564,163 A   10/1996 Lowry et al.
(Continued)

FOREIGN PATENT DOCUMENTS

CN    201301889 Y    9/2009
CN    101672322 A    3/2010
(Continued)

OTHER PUBLICATIONS

Communication under Rule 71(3) EPC Received for European Application No. 20707880.9, mailed on Mar. 5, 2025, 08 pages.
(Continued)

*Primary Examiner* — Jeffrey O'Brien
(74) *Attorney, Agent, or Firm* — Ray Quinney & Nebeker P.C.; John O. Carpenter

(57) ABSTRACT

An electronic device hinge includes a first body, a second body, and a link. The link is rotatable relative to the first body around a first pivot point and rotatable relative to the second body around a second pivot point. The first pivot point has a first rotational resistance and the second pivot point has a second rotational resistance that is different from the first rotational resistance. The hinge further includes a third body that is selectively positionable relative to the first body in a first configuration. The third body limits a first rotational range of motion around the first pivot point when positioned in the first configuration.

19 Claims, 10 Drawing Sheets

(56) References Cited

U.S. PATENT DOCUMENTS

| | | | |
|---|---|---|---|
| 5,644,469 A * | 7/1997 | Shioya | G06F 1/162 |
| | | | 361/679.09 |
| 6,266,236 B1 | 7/2001 | Ku et al. | |
| 6,464,195 B1 | 10/2002 | Hildebrandt | |
| 6,826,043 B2 * | 11/2004 | Chang | G06F 1/162 |
| | | | 248/913 |
| 7,061,753 B2 | 6/2006 | Michoux | |
| 7,403,378 B2 * | 7/2008 | Lo | G06F 1/1681 |
| | | | 361/679.55 |
| 7,478,786 B2 | 1/2009 | Copeland | |
| 7,742,285 B2 * | 6/2010 | Ishikura | G06F 1/1677 |
| | | | 345/157 |
| 8,074,323 B2 * | 12/2011 | Lin | G06F 1/162 |
| | | | 248/920 |
| 8,253,648 B2 * | 8/2012 | Nagai | G02F 1/13336 |
| | | | 345/169 |
| 8,908,364 B2 * | 12/2014 | Tseng | G06F 1/162 |
| | | | 345/905 |
| 8,914,946 B2 | 12/2014 | Hsu et al. | |
| 9,261,906 B2 * | 2/2016 | Arima | G06F 1/1637 |
| 9,291,299 B2 | 3/2016 | Richard | |
| 9,523,226 B1 | 12/2016 | Lam et al. | |
| 9,644,412 B2 | 5/2017 | Novin | |
| 9,791,674 B1 | 10/2017 | Topliss | |
| 9,927,844 B2 * | 3/2018 | Park | F16C 11/04 |
| 10,025,348 B2 * | 7/2018 | Arima | E05C 9/04 |
| 10,061,360 B1 | 8/2018 | Magi et al. | |
| 10,151,128 B2 | 12/2018 | Hatano | |
| 10,324,501 B1 | 6/2019 | Zimmerman et al. | |
| 10,407,957 B1 | 9/2019 | Camp et al. | |
| 10,558,245 B2 | 2/2020 | Morrison et al. | |
| 10,648,212 B2 | 5/2020 | Novin | |
| 10,761,571 B1 | 9/2020 | Cooper | |
| 10,852,765 B2 | 12/2020 | Sanchez | |
| 10,996,710 B2 | 5/2021 | Park | |
| 11,008,789 B2 * | 5/2021 | Hatano | E05D 3/12 |
| 11,106,249 B1 | 8/2021 | Zimmerman | |
| 11,237,643 B2 * | 2/2022 | Kulkarni | G06F 1/1681 |
| 11,507,145 B2 | 11/2022 | Nakamura | |
| 2004/0021051 A1 | 2/2004 | Chiu | |
| 2005/0138775 A1 | 6/2005 | Oakley | |
| 2006/0211457 A1 * | 9/2006 | Otsuka | G06F 1/1671 |
| | | | 455/575.1 |
| 2006/0288258 A1 | 12/2006 | Lo | |
| 2007/0058329 A1 | 3/2007 | Ledbetter | |
| 2007/0183123 A1 | 8/2007 | Chuan | |
| 2008/0094792 A1 | 4/2008 | Chen | |
| 2008/0271288 A1 | 11/2008 | Senatori | |
| 2011/0312392 A1 | 12/2011 | Reeves et al. | |
| 2012/0124775 A1 | 5/2012 | Ceci | |
| 2013/0160244 A1 | 6/2013 | Sayama | |
| 2013/0318746 A1 | 12/2013 | Kuramochi | |
| 2014/0157546 A1 * | 6/2014 | Ho | E05D 7/00 |
| | | | 16/221 |
| 2014/0165334 A1 | 6/2014 | Liu | |
| 2014/0338483 A1 | 11/2014 | Hsu et al. | |
| 2014/0375194 A1 * | 12/2014 | Arima | G06F 1/1681 |
| | | | 312/322 |
| 2014/0375196 A1 | 12/2014 | Nguyen | |
| 2015/0002998 A1 | 1/2015 | Arima | |
| 2015/0077915 A1 | 3/2015 | Saito | |
| 2015/0121654 A1 | 5/2015 | Novin | |
| 2015/0185786 A1 | 7/2015 | Yeh et al. | |
| 2016/0147267 A1 | 5/2016 | Bitz et al. | |
| 2016/0327994 A1 | 11/2016 | Lee | |
| 2017/0097657 A1 | 4/2017 | Hampton et al. | |
| 2017/0208703 A1 | 7/2017 | Lin | |
| 2017/0218672 A1 | 8/2017 | Novin | |
| 2018/0044958 A1 * | 2/2018 | Tazbaz | G06F 1/1616 |
| 2018/0066465 A1 | 3/2018 | Tazbaz et al. | |
| 2018/0088634 A1 | 3/2018 | Bitz | |
| 2018/0112447 A1 | 4/2018 | Hatano | |
| 2018/0188781 A1 * | 7/2018 | Park, Jr | G06F 1/1679 |
| 2018/0209473 A1 * | 7/2018 | Park | G06F 1/1618 |
| 2019/0011957 A1 | 1/2019 | Wendt | |
| 2019/0029135 A1 | 1/2019 | Park et al. | |
| 2019/0064886 A1 | 2/2019 | Wendt | |
| 2019/0243426 A1 | 8/2019 | Morrison et al. | |
| 2020/0040626 A1 | 2/2020 | Hatano | |
| 2020/0233459 A1 | 7/2020 | Sanchez | |
| 2021/0289644 A1 | 9/2021 | Zarnowitz | |
| 2022/0057844 A1 | 2/2022 | Nakamura | |
| 2023/0034612 A1 * | 2/2023 | Hillyerd | G06F 1/1681 |
| 2023/0049295 A1 | 2/2023 | Hillyerd | |
| 2023/0049811 A1 | 2/2023 | Krahn | |
| 2023/0084038 A1 * | 3/2023 | Yee | G06F 1/162 |
| | | | 361/679.27 |
| 2023/0129909 A1 | 4/2023 | Yee | |
| 2024/0111330 A1 * | 4/2024 | Yu | G06F 1/1683 |
| 2024/0111339 A1 * | 4/2024 | Sun | G06F 1/1681 |

FOREIGN PATENT DOCUMENTS

| | | |
|---|---|---|
| CN | 102572029 A | 7/2012 |
| CN | 103291163 A | 9/2013 |
| CN | 103576772 A | 2/2014 |
| CN | 104765412 A | 7/2015 |
| CN | 104767843 A | 7/2015 |
| CN | 204553526 U | 8/2015 |
| CN | 107771308 A | 3/2018 |
| CN | 109564449 A | 4/2019 |
| CN | 109643144 A | 4/2019 |
| CN | 110168470 A | 8/2019 |
| CN | 110226149 A | 9/2019 |
| CN | 108691470 A | 9/2021 |
| EP | 2397929 A1 | 12/2011 |
| EP | 2557473 A1 | 2/2013 |
| EP | 2615331 A1 | 7/2013 |
| EP | 2696255 A2 | 2/2014 |
| EP | 2911030 A2 | 8/2015 |
| EP | 3069208 A1 | 9/2016 |
| GB | 931284 A | 7/1963 |
| WO | 2010015931 A2 | 2/2010 |

OTHER PUBLICATIONS

Final Office Action mailed on Apr. 14, 2025, in U.S. Appl. No. 17/914,684, 11 pages.

Final Office Action mailed on Mar. 13, 2025, in U.S. Appl. No. 17/790,926, 8 pages.

Final Office Action mailed on Mar. 25, 2025, in U.S. Appl. No. 17/793,624, 10 pages.

Notice of Allowance mailed on Apr. 29, 2025, in U.S. Appl. No. 17/790,914, 10 pages.

Second Office Action Received for Chinese Application No. 202080099092.7, mailed on May 16, 2025, 15 Pages (English Translation Provided).

First Office Action Received for Chinese Application No. 202080099087.6, mailed on Aug. 17, 2024, 17 pages (English Translation Provided).

Non-Final Office Action mailed on Aug. 27, 2024, in U.S. Appl. No. 17/790,926, 9 pages.

Non-Final Office Action mailed on Aug. 28, 2024, in U.S. Appl. No. 17/793,624, 12 pages.

"International Search Report and Written Opinion Issued in PCT Application No. PCT/US20/014025", Mailed Date: Oct. 9, 2020, 14 Pages.

"International Search Report and Written Opinion Issued in PCT Application No. PCT/US20/024692", Mailed Date: Dec. 11, 2020, 15 Pages.

"International Search Report and Written Opinion Issued in PCT Application No. PCT/US20/024700", Mailed Date: Nov. 23, 2020, 12 Pages.

"International Search Report and Written Opinion Issued in PCT Application No. PCT/US20/040030", Mailed Date: Oct. 9, 2020, 13 Pages.

"International Search Report and Written Opinion Issued in PCT Application No. PCT/US20/040031", Mailed Date: Dec. 2, 2020, 17 Pages.

(56) References Cited

OTHER PUBLICATIONS

"Invitation to Pay Additional Fees Issued in PCT Application No. PCT/US20/040031", Mailed Date: Oct. 7, 2020, 10 Pages.
Communication pursuant to Article 94(3) EPC, Received for European Application No. 20720607.9, mailed on Jul. 5, 2024, 8 pages.
Communication under Rule 71(3) received in European Application No. 20719884.7, mailed on Jun. 18, 2024, 8 pages.
Second Office Action Received for Chinese Application No. 202080092255.9, mailed on May 23, 2024, 11 pages. (English Translation Provided).
U.S. Appl. No. 17/790,914, filed Jul. 5, 2022.
U.S. Appl. No. 17/793,624, filed Jul. 18, 2022.
U.S. Appl. No. 17/790,926, filed Jul. 5, 2022.
U.S. Appl. No. 17/914,684, filed Sep. 26, 2022.
Communication pursuant to Article 94(3) Received in European Patent Application No. 20743461.4, mailed on Jan. 16, 2025, 8 pages.
Communication pursuant to Article 94(3) Received in European Patent Application No. 20743462.2, mailed on Dec. 10, 2024, 5 pages.
Decision on Rejection Received for Chinese Application No. 202080092255.9, mailed on Jan. 13, 2025, 8 pages (English Translation Provided).
Decision to Grant pursuant to Article 97(1) Received for European Application No. 20719884.7, mailed on Oct. 24, 2024, 02 pages.
Final office action mailed on Jan. 16, 2025, in U.S. Appl. No. 17/790,914, 15 pages.
Non-Final Office Action mailed on Dec. 11, 2024, in U.S. Appl. No. 17/914,684, 10 pages.
Notice of grant Received for Chinese Application No. 202080093593.4, mailed on May 10, 2024, 4 pages.
Notice of Grant Received for Chinese Application No. 202080099087.6, mailed on Feb. 8, 2025, 9 pages (English Translation Provided).
Non-Final Office Action mailed on Sep. 28, 2024, in U.S. Appl. No. 17/790,914, 09 pages.
Office Action Received for Chinese Application No. 202080092254.4, mailed on Aug. 29, 2024, 9 pages. (English Translation Provided).
Office Action Received for Chinese Application No. 202080099092.7, mailed on Nov. 21, 2024, 15 Pages (English Translation Provided).
Office Action Received for Chinese Application No. 202080092254.4, mailed on Dec. 11, 2023, 11 pages (English Translation Provided).
Office Action received for Chinese Application No. 202080092255.9, mailed on Dec. 1, 2023, 16 Pages (English Translation Provided).
Office Action Received for Chinese Application No. 202080093593.4, mailed on Dec. 28, 2023, 11 pages.
Communication Under Rule 71(3) EPC, Received in European Patent Application No. 20743462.2, mailed on May 14, 2025, 08 pages.
Decision on Rejection Received for Chinese Application No. 202080099092.7, mailed on Sep. 8, 2025, 07 Pages (English Translation Provided).
Decision to grant a European patent pursuant to Article 97(1) EPC, Received in European Patent Application No. 20743462.2, mailed on Jul. 31, 2025, 03 pages.
Decision to Grant pursuant to Article 97(1) received in European Application No. 20707880.9, mailed on Jul. 3, 2025, 2 pages.
Examination report Received for Indian Application No. 202247046431, mailed on Jun. 2, 2025, 7 pages.
Non-Final Office Action mailed on Aug. 22, 2025, in U.S. Appl. No. 17/914,684, 10 Pages.
Non-Final Office Action mailed on Jul. 2, 2025, in U.S. Appl. No. 17/793,624, 14 pages.
Non-Final Office Action mailed on Jul. 22, 2025, in U.S. Appl. No. 17/790,926, 17 pages.
Notice of Allowance mailed on Aug. 26, 2025, in U.S. Appl. No. 17/790,914, 10 pages.

* cited by examiner

BISTABLE HINGE WITH DETERMINANT MOTION

CROSS REFERENCE TO RELATED APPLICATIONS

This application is a U.S. Nationalization of PCT Application Number PCT/US2020/024700, filed on Mar. 25, 2020, the entirety of which is incorporated herein by reference.

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computer. Hybrid computers may act as a tablet computer or a laptop computer.

Some hybrid computers are clamshell devices that are used in different orientations. For example, some hybrid computers may be oriented with a touch-sensitive surface laid flat against the table or other surfaces on which the user is operating the hybrid computer. Some hybrid computers have a keyboard in a first portion of the computer and a touch-sensitive display in a second portion of the computer, where the first portion and the second portion are connected by a hinge.

Conventional hinges have a single pivot point, limiting the geometries at which the first portion and second portion may be positioned. Some conventional hinges will not allow the first portion and second portion to be oriented at greater than 180°. Other multiple pivot hinges allow for motion of the first portion and second portion of the hybrid computer past 180° but provide no control over which pivot point within the hinge is active during the movement of the hinge.

A multiple pivot hinge with indeterminant motion does not control an active hinge, resulting in possible damage to the hybrid computer, rotation of a pivot point with a pinched or kink wire, and flexion of a keyboard or touch-sensitive surface when part of the first portion or second portion of the hybrid computer is not flat on the table or other surfaces.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In an embodiment, an electronic device hinge includes a first body, a second body, and a link. The link is rotatable relative to the first body around a first pivot point and rotatable relative to the second body around a second pivot point. The first pivot point has a first rotational resistance and the second pivot point has a second rotational resistance that is different from the first rotational resistance. The hinge further includes a third body that is selectively positionable relative to the first body in a first configuration. The third body limits a first rotational range of motion around the first pivot point when positioned in the first configuration.

In some embodiments, a method of providing bistable motion in a hinge includes rotating a first body relative to a link around a first pivot point to a first pivot point angle between the first body and the link and detecting a position of a third body relative to the first body. When the third body is in a first configuration relative to the first body at the first pivot point angle, the method includes rotating the link relative to a second body around a second pivot point. When the third body is not in the first configuration at the first pivot point angle, the method includes continuing to rotate the first body relative to the link around the first pivot point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
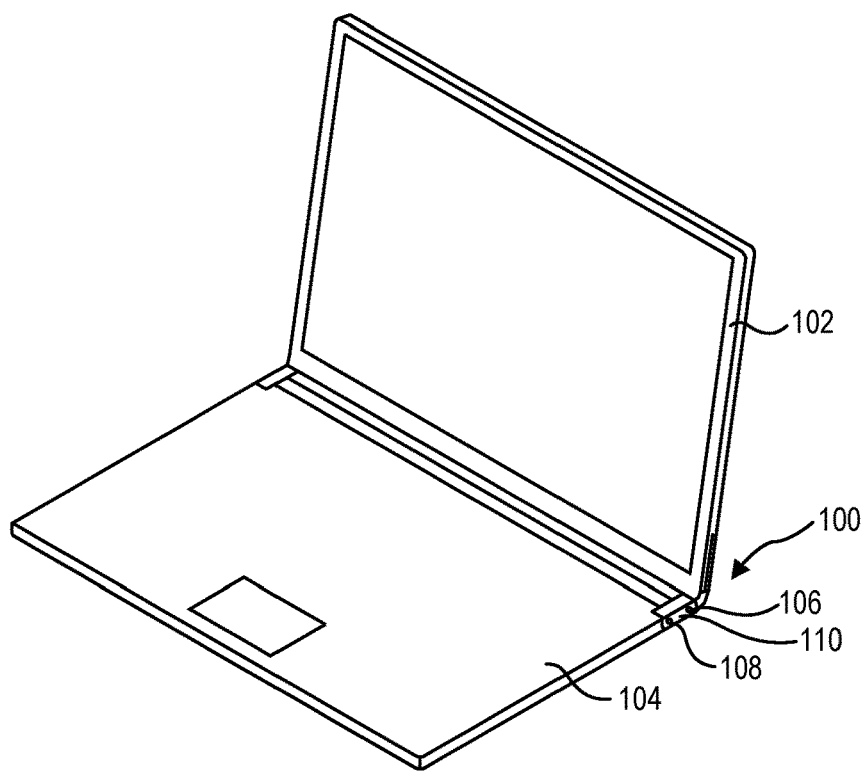
FIG. 1 is a perspective view of an electronic device with a hinge having a plurality of rotational axes, according to at least one embodiment of the present disclosure.

This disclosure generally relates to electronic device hinges. More particularly, this disclosure generally relates to apparatuses, systems, and methods for selectively changing the axis of rotation of a hinge to allow an electronic device to achieve a variety of postures for use and for transport or storage.

A hinge for an electronic device may have a plurality of pivot points. The hinge may pivot at only one of the pivot points at a time. At any given time, at least one of the pivot points may be locked, such that application of force to a side of the hinge may result in only one of the pivot points rotating at a time. The controlled movement of specific pivot points in the hinge is known as determinant motion. At any given position of the hinge, only one pivot point may be free to rotate. In other embodiments, the pivot points may both be able to rotate, but the pivot points have different resistance. The different resistances around each rotational axis produce a preferential rotation around the axis or pivot point with a lower resistance at that position in the range of motion of the hinge. The lower resistance pivot point functions as the active pivot point. The resistance may be different in different rotational directions or at different positions within the rotational range of motion.

By controlling the location of the active pivot point and the locked pivot point in the hinge, the location and relative position of a first side of the hinge and a second side of the hinge may be controlled. For example, a laptop having a hinge with fully determinant motion according to the present disclosure may move from a closed position (e.g., a 0° relationship between the screen and the keyboard of the laptop) to an open position (e.g., a 90° relationship between the screen and the keyboard of the laptop) with rotation only about a first pivot point. Movement of the hinge beyond the 90° position may lock the first pivot point and unlock the second pivot point, such that force applied to the hinge rotates about the second pivot point up to a flat position (e.g., a 180° relationship between the screen and the keyboard of the laptop).

Determinant motion up to 90° may ensure that the active pivot point is positioned to extend the footprint of the device. For example, stability of a laptop or other clamshell device may be at least partially based on how large the dimensions of the device's footprint are. When the portion of the hinge between the first pivot point and the second pivot point can be positioned in line with the first body of the device (e.g., the keyboard of a laptop), the base upon which the device rests becomes larger and the center of mass of the device is lower than if the active pivot point is the second pivot point nearer the second body of the device (e.g., the display of a laptop).

Determinant motion up to 180° may ensure that the device may move from a clamshell configuration at a 0° position to a fully flat configuration predictably and reliably. For example, a hybrid laptop may have a touch-sensitive display or surface incorporated into one or both bodies of the device. Applying force or pressure to the touch-sensitive surface without being flat against a table or other supporting surfaces may flex or damage the laptop or the hinge.

Upon returning toward the 0° position of the hinge, a bistable hinge according to the present disclosure may behave differently when the first portion of the device (e.g., the display) is connected to the hinge compared to when the first portion is disconnected or otherwise moved away from the hinge. For example, the hinge may provide determinant motion around both pivot points back to the original clamshell configuration to close the laptop when the display is connected to the hinge. In some embodiments, the display may be removed, rotated, or translated relative to the hinge while open to change the device into a tablet configuration. When the display is removed, rotated, or translated relative to the hinge, closing the hinge may result in rotation about only one of the pivot points and allow the device to enter a tablet or nested configuration with a smaller height of the hinge.

FIG. 1 is a perspective view of a hinge 100 that connects a first body 102 of an electronic device to a second body 104 of the electronic device. The hinge 100 includes a first pivot point 106 and a second pivot point 108. The first pivot point 106 and the second pivot point 108 of the hinge 100 are connected by a link 110. As the link 110 rotates relative to the first pivot point 106, the link 110 can move the second pivot point 108. For example, as the link 110 rotates around the second pivot point 108 connected to the second body 104 (e.g., the base of the electronic device), the first pivot point 106 connected to the first body 102 (e.g., the display of the electronic device) can move relative to the second body 104. At different locations in the range of motion of the hinge 100 and/or the direction of motion of the hinge 100, either the first pivot point 106 or the second pivot point 108 will be the active pivot point.

In some embodiments, a hinge 100 may connect a first body 102 of an electronic device to a second body 104 of the electronic device. For example, the first body 102 may house a display, such as a touchscreen display while the second body 104 may house one or more computing components, such as a CPU, a GPU, one or more storage devices, one or more input devices, a power supply, or other computing components that may be configured to communicate with (e.g., receive information from, send information to, or send power to) the display in the first body 102.

The hinge 100 may allow the first body 102 and second body 104 to communicate data or electrical signals through the hinge 100. Determinant motion of the hinge 100 can reduce the likelihood of damage to the data or electrical conduits that provide the data or electrical communication across the hinge 100.

In some embodiments, the motion of the hinge 100 may change depending on the presence and/or position of the first body 102 or of another body relative to the hinge 100. For example, the display may be supported by and separable from the first body 102. In such embodiments, removing or moving the display of the electronic device changes the mode of the hinge 100, such that the hinge 100 closes and/or opens differently when the display is not connected to the first body 102.

Figure 2:
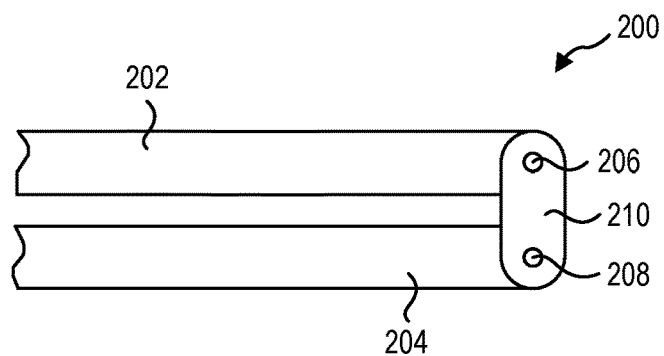
FIG. 2 is a side schematic view of a device with a determinant motion hinge, according to at least one embodiment of the present disclosure.

In some embodiments, such as shown in FIG. 2, a hinge 200 may have a closed position with the first body 202 and second body 204 oriented at a substantially 0° relationship to one another. While the present disclosure describes the operation of a hinge between 0° and 180°, it should be understood that in other embodiments, a hinge according to the present disclosure may be configured to operate within any range from 0° to 360°, such as 0° to 135°, 30° to 120°, 45° to 315°, or any other range of angles between the first body and second body.

The hinge 200 may pivot around a first pivot point 206 and a second pivot point 208 with a link 210 between the first pivot point 206 and second pivot point 208. The link 210 may be any length to provide sufficient clearance between the first body 202 and second body 204 during operation of the hinge 200.

Figure 3:
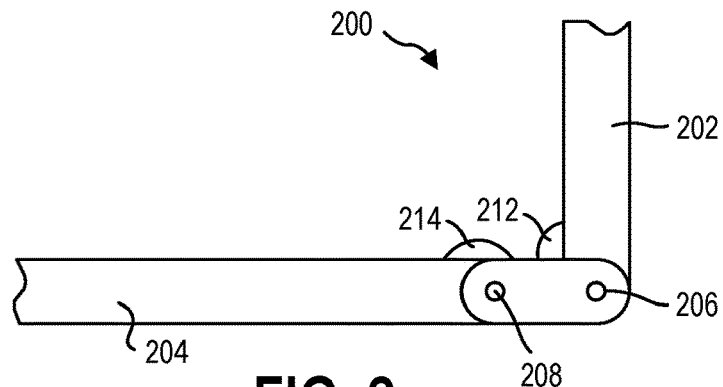
FIG. 3 is a side schematic view of the device with a determinant motion hinge of FIG. 2 open to 90°.

FIG. 3 illustrates the embodiment of a hinge 200 of FIG. 2 rotated about the second pivot point 208 such that the first body 202 and the second body 204 are oriented at a 90° relationship to one another. The first pivot point 206 may be locked at (or remain at) a first pivot point angle 212 during movement of the second pivot point 208 until the second pivot point reaches a predetermined second pivot point angle 214, such as 180°. The initial rotation about the second pivot point 208 extends the footprint of the electronic device by effectively adding the length of the link 210 to the second body 204. This may allow the electronic device to be more stable compared to a hinge with indeterminant motion or a hinge that rotates about the first pivot point 206 before the second pivot point 208.

Figure 4:
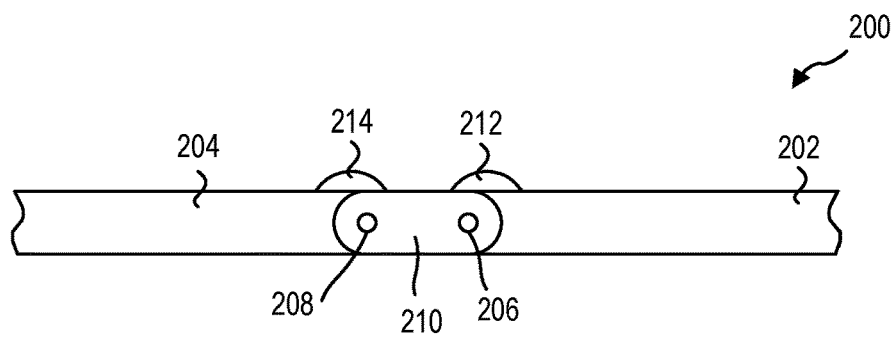
FIG. 4 is a side schematic view of the device with a determinant motion hinge of FIG. 2 open to 180°.

When the second pivot point angle 214 reaches 180°, the second pivot point 208 may lock and the first pivot point 206 may unlock. The hinge 200 may then rotate about the first pivot point 206 until the first pivot point angle 212 reaches a predetermined position, such as 180°, as shown in FIG. 4. The first body 202, link 210 and the second body 204 may lie in a single plane.

It should be understood that in some embodiments, the first pivot point 206 or the second pivot point 208 is a friction hinge. For example, a greater amount of force may be applied to the hinge 200 to move the hinge 200 about the first pivot point 206 than an amount of force needed to move the hinge 200 about the second pivot point 208. In other examples, a greater amount of force may be applied to the hinge 200 to move the hinge 200 about the second pivot point 208 than an amount of force needed to move the hinge 200 about the first pivot point 206. In some embodiments, as will be described in relation to FIG. 9 through 12, the hinge includes a one-way bearing that provides different resistance in different rotational directions.

Figure 5:
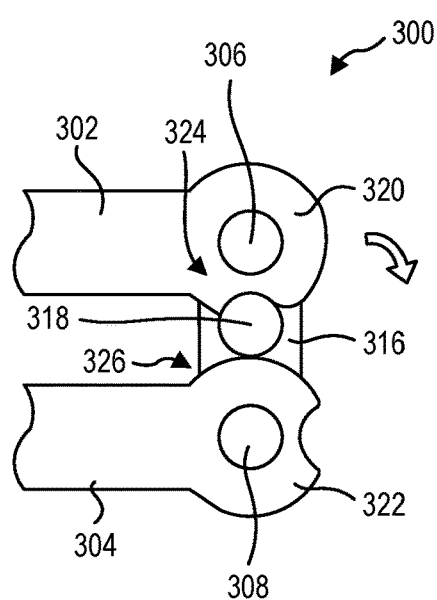
FIG. 5 is a side cutaway schematic view of a device with a cam lock hinge having a locked pivot point, according to at least one embodiment of the present disclosure.

FIG. 5 through FIG. 8 illustrate an embodiment of a hinge 300 that provides determinant motion up to 180° as illustrated in FIG. 2 through 4. FIG. 5 illustrates the hinge 300 in the closed configuration with a first body 302 and a second body 304 at a 0° orientation from one another. The first body 302 is movable about a first pivot point 306 and the second body 304 is movable about a second pivot point 308.

In FIG. 5, the first pivot point 306 is locked by a follower 318 protruding from an internal slider 316. The first body 302 cannot rotate about the first pivot point 306 because the first cam 320 has a cam surface 324 thereon, and the follower 318 is positioned in the cam surface 324. The follower 318 (and associated internal slider 316) may be moveable relative to the first pivot point, but the second cam 322 is positioned to limit and/or prevent movement of the follower 318.

Figure 6:
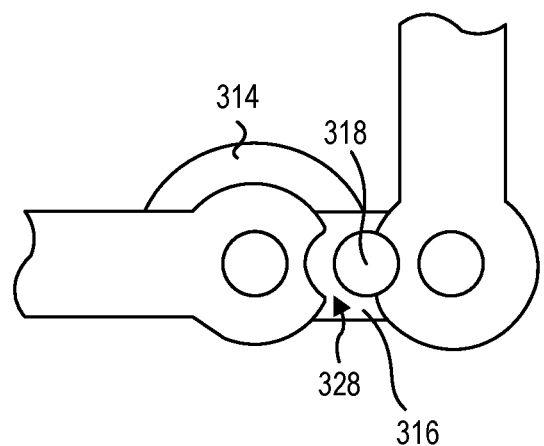
FIG. 6 is a side cutaway schematic view of the embodiment of a device with a cam lock hinge of FIG. 5 open to 90°.

The hinge 300 may move about the second pivot point 308 as the follower 318 may move along the outer surface 326 of the second cam 322 until the second pivot point angle 314 reaches 180°, as shown in FIG. 6. Once the second pivot point angle 314 reaches 180°, the follower 316 may align with the cam surface 328 of the second cam 322. The cam surface 328 of the second cam 322 may provide clearance for the follower 318 and associated internal slider 316 to move relative to the pivot points 306, 308.

Figure 7:
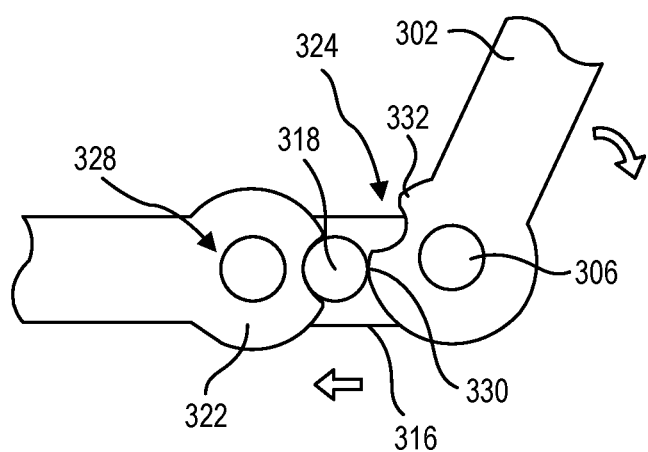
FIG. 7 is a side cutaway schematic view of the embodiment of a device with a cam lock hinge of FIG. 5 moving a follower.

FIG. 7 illustrates the movement of the first body 302 about the first pivot point 306 urging the follower 318 and associated internal slider 312 toward the second cam 322. The cam surface 324 of the first cam 320 has a release edge 332 and a drive edge 330. The release edge 332 is configured to limit and/or prevent rotation of the first cam 320 relative to the follower 318 when the follower 318 is positioned in the cam surface 324 of the first cam 320. The drive edge 330 is rounded to facilitate the movement of the follower 318 away from the first cam 320 when the first cam 320 rotates about the first pivot point 306. For example, when the follower 318 is aligned with the cam surface 328 of the second cam 322, the drive edge 330 of the first cam 320 may urge the follower 318 toward the second cam 322 upon rotation of the first cam 320. The release edge 332 may rotate away from the follower 318.

The drive edge 330 may be rounded such that the drive edge 330 remains in contact with the follower 318 through an amount of rotation of the first cam 320 about the first pivot point 306. In some embodiments, the first cam 320 may rotate about the first pivot point 306 up to 45° before the drive edge 330 passes the follower 318. In other embodiments, the first cam 320 may rotate about the first pivot point 306 up to 40° before the drive edge 330 passes the follower 318. In yet other embodiments, the first cam 320 may rotate about the first pivot point 306 up to 30° before the drive edge 330 passes the follower 318. In at least one embodiment, the first cam 320 may rotate about the first pivot point 306 up to 20° before the drive edge 330 passes the follower 318.

Figure 8:
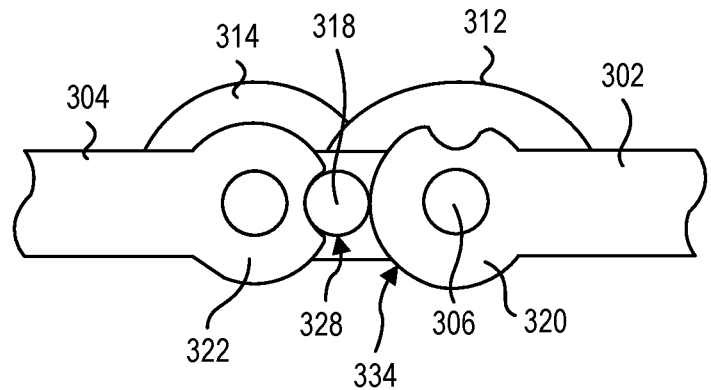
FIG. 8 is a side cutaway schematic view of the embodiment of a device with a cam lock hinge of FIG. 5 open to 180°.

Referring to FIG. 8, after the follower 318 and associated internal slider 316 moves relative to the pivot points 306, 308, the follower 318 may be received by the cam surface 328 of the second cam 322 and the follower 318 may no longer limit the rotation of the first cam 320 about the first pivot point 306, unlocking the first pivot point 306 and allowing the first body 302 and first cam 320 to rotate freely with the follower 318 adjacent an outer surface 334 of the first cam 320. The first body 302 and first cam 320 may rotate until the first pivot point angle 312 is 180° and the first body 302 and second body 304 lie in a single plane (or another predetermined angle).

The embodiment depicted in FIG. 5 through FIG. 8 provides determinant motion from a 0° to 180° orientation of the first body and second body of the hinge by use of a single lock. In other embodiments, a hinge according to the present disclosure may have more than two cams and/or more than one follower to provide a plurality of locks. A plurality of locks may provide determinant motion over a larger range of orientations and/or in both rotational directions of the hinge.

Figure 9:
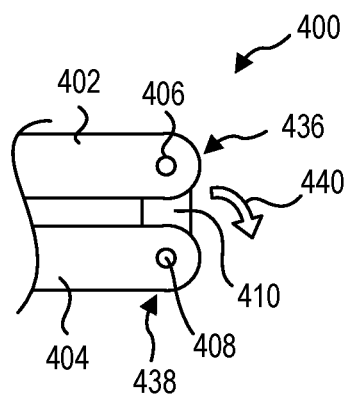
FIG. 9 is a side schematic view of another embodiment of a device with a differential bearing hinge with a plurality of pivot points, according to at least one embodiment of the present disclosure.
Figure 10:
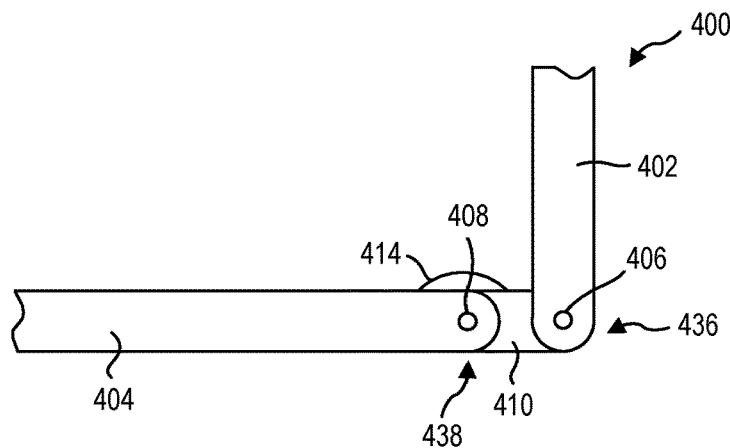
FIG. 10 is a side schematic view of the embodiment of a device with a differential bearing hinge of FIG. 9 open to 90°.
Figure 11:
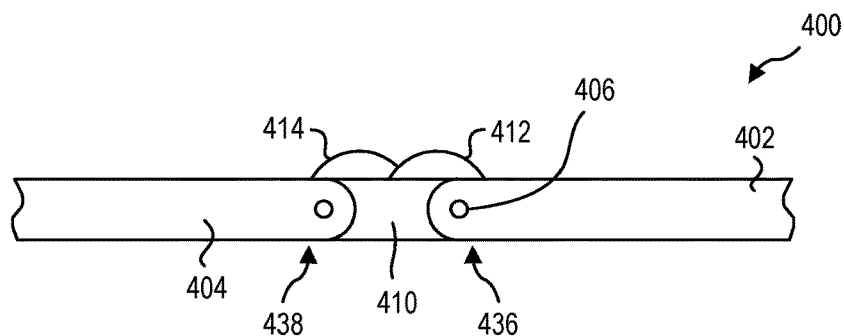
FIG. 11 is a side schematic view of the embodiment of a device with a differential bearing hinge of FIG. 9 open to 180°.

FIG. 9 through FIG. 11 illustrate another embodiment of a hinge for providing determinant motion from a closed clamshell position to an open position. FIG. 9 is a side view of an embodiment of a hinge 400 connecting a first body 402 to a second body 404. The hinge 400 includes a first pivot point 406 proximate the first body 402 and a second pivot point 408 proximate the second body 404. The first pivot point 406 and the second pivot point 408 are connected by a link 410 therebetween.

The hinge 400 includes bearings at the first pivot point 406 and the second pivot point 408 that regulate the rotation of the first body 402 and link 410, and the second body 404 and the link 410, respectively. The first bearing 436 provides a first rotational resistance around the first pivot point 406 in a first rotational direction 440 of the hinge 400. The second bearing 438 provides a second rotational resistance around the second pivot point 408 in the first rotational direction 440 of the hinge 400. In some embodiments, the first rotational resistance is different from the second rotational resistance. For example, when the second rotational resistance of the second bearing 438 around the second pivot point 408 is less than the first rotational resistance of the first bearing 436 around the first pivot point 406, a force applied to the hinge 400 to move the first body 402 relative to the second body 404 will preferentially rotate the hinge 400 around the second pivot point 408. The greater first rotational resistance of the first bearing 436 will hold the first pivot point 406 at a constant angle while the link 410 and second body 404 move relative to one another around the second pivot point 408.

FIG. 10 is a side view of the hinge 400 of FIG. 9 with the link 410 rotated around the second pivot point 408 relative to the second body 404. The link 410 and second body 404 can reach a second pivot point angle 414, at which point, rotation around the second pivot point 408 ends. In some embodiments, the link 410 and second body 404 contact one another in a hardstop that limits further rotation. In other embodiments, the second bearing 438 includes a hardstop or limit that limits and/or prevents further rotation of the second pivot point 408 to prevent contact between the link 410 and second body 404.

When further rotation toward the open position of the hinge 400 is limited around the second pivot point 408, the second rotational resistance of the second pivot point effectively increases beyond the first rotational resistance of the first pivot point 406 and/or first bearing 436. Further application of force to the first body 402 toward the open position produces relative rotation of the first body 402 and link 410 around the first pivot point 406 as shown in FIG. 11.

The first body 402 will continue to rotate relative to the link 410 around the first pivot point 406 until the first body 402 and link 410 reach a pivot point angle 412 of the open position. In some embodiments, further movement of the first pivot point 406 is limited by contact between the first body 402 and the link 410. In other embodiments further movement of the first pivot point 406 is limited by the first bearing 436 to limit and/or prevent contact between the first body 402 and the link 410.

In some embodiments, the second pivot point 414 remains at the second pivot point angle 414, allowing the hinge 400 to attain the open position. The open position of the hinge 400 illustrated in FIG. 11 is 180° between the first body 402 and second body 404. In other embodiments, the open position of the hinge 400 is greater than 180° between the first body 402 and the second body 404. In yet other embodiments, the open position of the hinge 400 is less than 180° between the first body 402 and the second body 404. For example, the open position may be about 135° between the first body 402 and the second body 404. In a particular example, the open position is about 135° between the first body 402 and the second body 404 with a first pivot point angle 412 of about 45° and a second pivot point angle 414 of about 90°. In at least one example, the open position is adjustable by adjusting at least one of the first bearing 436 and second bearing 438.

In some embodiments, the first rotational resistance is different when the first body 402 rotates in a first direction (e.g. toward the open position) than in a second direction (e.g., returning toward a closed position). FIG. 9 through FIG. 11 illustrate the preferential rotation of the second pivot point 408 relative to the first pivot point 406 when a first rotational resistance is greater than a second rotational resistance. When rotating the hinge 400 in a second direction toward the closed position, the first rotational resistance is less than the second rotational resistance. By changing the first rotational resistance based on the rotational direction, the hinge 400 behavior will reverse when moving toward the closed position. For example, by decreasing the first rotational resistance to be less than the second rotational resistance when closing the hinge 400, the hinge 400 will preferentially rotate (e.g., rotate first) around the first pivot point 406 and subsequently around the second pivot point.

Figure 12:
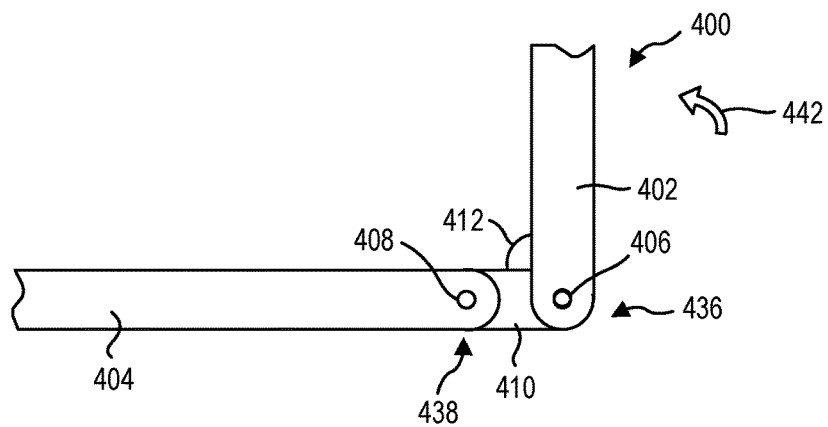
FIG. 12 is a side schematic view of the embodiment of a device with a differential bearing hinge of FIG. 9 returning to 90°.

FIG. 12 shows the hinge 400 moving from the open position toward the closed position in a second rotational direction 442. In some embodiments, the first bearing 436 is a one-way bearing that provides a different resistance in the second rotational direction 442 from the first rotational direction (e.g., the first rotational direction 440 described in relation to FIG. 9). The first rotational resistance of the first pivot point 406 in the second rotational direction 442 is less than the second rotational resistance of the second pivot point 408 in the second rotational direction 442. The hinge 400, therefore, rotates around the first pivot point 406 before rotating around the second pivot point 408 when moving in the second rotational direction 442.

Figure 13:
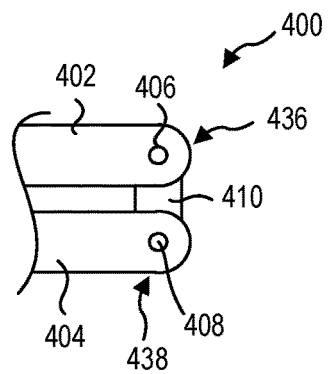
FIG. 13 is a side schematic view of the embodiment of a device with a differential bearing hinge of FIG. 9 returning to a clamshell configuration.

The first body 402 rotates around the first pivot point 406 until reaching a closed first pivot point angle 412. The first rotational resistance then increases (either by contact between the first body 402 and the link 410 or by a restriction in the first bearing 436), and the rotation of the hinge 400 (e.g., rotation of the link 410 relative to the second body 404) continues around the second pivot point 408 to the clamshell closed position illustrated in FIG. 13.

In some embodiments, the first pivot point 406 includes a one-way first bearing 436 that provides a first rotational resistance that changes with rotational direction, and the second pivot point 408 includes a second bearing 438 that provides a constant rotational resistance irrespective of rotational direction. In other embodiments, the first pivot point 406 includes a one-way first bearing 436 that provides a first rotational resistance that changes with rotational direction, and the second pivot point 408 includes a one-way second bearing 438 that provides a second rotational resistance that changes with rotational direction.

Even when the second bearing 438 changes second rotational resistance with the rotational direction, the first rotational resistance is greater than the second rotational resistance in the first rotational direction and the first rotational resistance is less than the second rotational resistance in the second rotational direction. This provides the second pivot point 408 is the active pivot point initially upon movement in the first rotational direction and the first pivot point 406 is the active pivot point initially upon movement in the second rotational direction.

In other words, when the hinge 400 is positioned with the first body 402 and second body 404 at an angle between 0° and 90°, the active pivot point is the second pivot point 408, and when the hinge 400 is positioned with the first body 402 and the second body 404 at an angle between 90° and 180°, the active pivot point is the first pivot point 406.

In some embodiments, a hinge behaves differently depending on a state of the first body. For example, the hinge may have a different range of motion when the first body is connected to the hinge. In another example, the first pivot point has a first range of motion when a third body is connected to the first body and a different second range of motion with a third body is disconnected from or moved relative to the first body.

Figure 14:
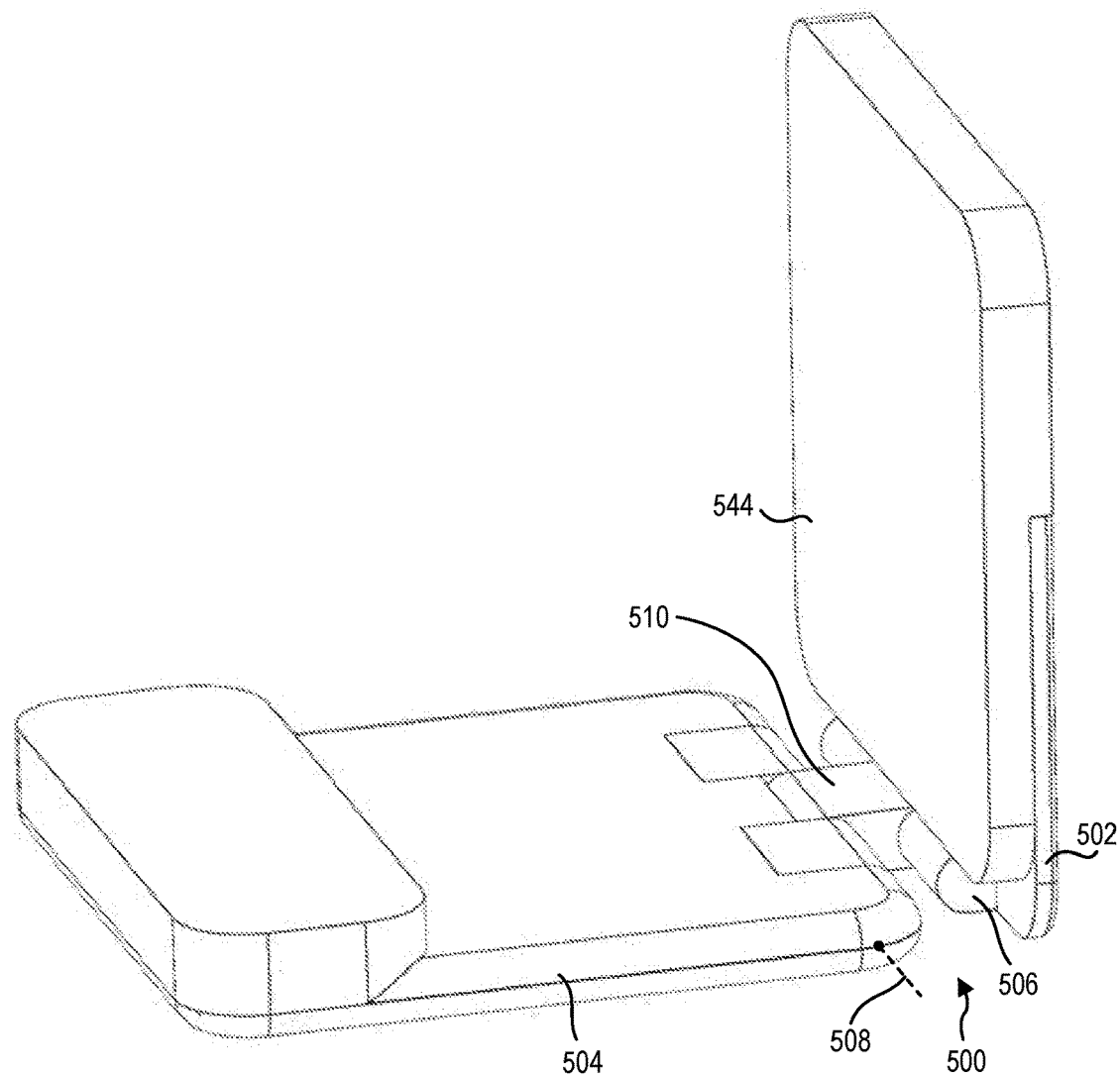
FIG. 14 is a perspective view of an electronic device with a bistable hinge, according to at least one embodiment of the present disclosure.

FIG. 14 illustrates an embodiment of another electronic device with a hinge 500 connected to a first body 502 and a second body 504. The first body 502 supports a third body 544. The first body 502 functions as a stand for the third body 544. In some embodiments, the first body 502 provides electrical and/or data communication between the second body 504 and the third body 544. In other embodiments, the first body 502 supports the third body 544 while the third body 544 and second body 504 communicate through a wireless data communication. For example, the third body 544 may include a processor in communication with a first wireless communication device, and the second body 504 may include a hardware storage device in communication with a second wireless communication device. The processor of the third body 544 may access the information stored on the hardware storage device of the second body 504 through the first and second wireless communication devices.

The first body 502 supports the third body 544 in the depicted "laptop configuration" with the link 510 in line with the second body 504. When a user closes the hinge 500 in the laptop configuration, the first pivot point 506 rotates to the 90° orientation illustrated (between the first body 502 and the link 510), stops, and rotation about the second pivot point 508 raises the link 510 to a 90° configuration with the second body 504. The link 510 then provides displacement of the first body 502 and second body 504 in the z-direction to enter the clamshell configuration illustrated in FIG. 15.

In some embodiments, the third body 544 contacts the second body in the laptop configuration. The contact between the third body 544 and the second body 504 provides a physical hardstop on the rotational range of motion of the first pivot point 506 and forces any further rotation to be around the second pivot point 508. In other embodiments, the presence of the third body 544 in the laptop configuration with the first body 502 actuates a locking mechanism in the hinge 500 to limit the rotational range of motion of the first pivot point 506 and forces any further rotation to be around the second pivot point 508.

Figure 15:
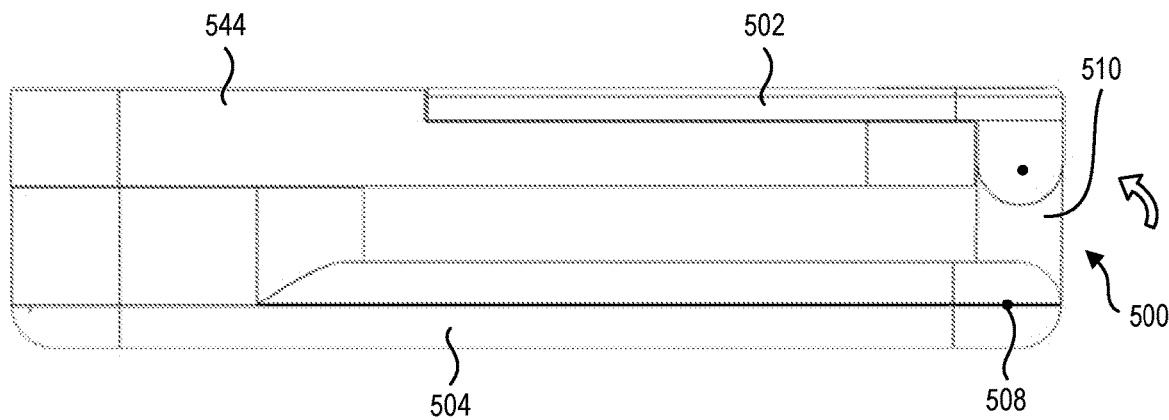
FIG. 15 is a side view of the electronic device of FIG. 14 in a clamshell configuration.
Figure 16:
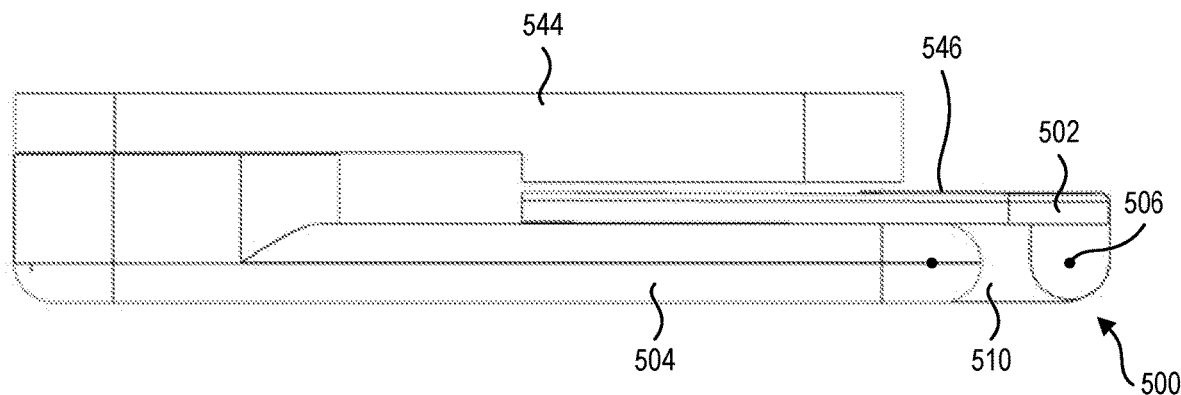
FIG. 16 is a side view of the electronic device of FIG. 14 in a tablet configuration.

FIG. 16 is a side view of the electronic device of FIGS. 14 and 15 in a second closed configuration. The hinge 500 has a second stable closed configuration in a "nested configuration" of the hinge 500 where the link 510 remains in line with (e.g., at a 180° orientation from) the second body 504. The link 510 being in line with the second body 504 does not provide the displacement described in relation to FIG. 15 in the clamshell configuration. In some embodiments, the nested configuration allows the first body 502 to nest against the second body 504, with a surface of the first body 502 sitting flush against a surface of the second body 504. In the nested configuration, the first pivot point 506 rotates to a 0° orientation (e.g., rotates and closes beyond the 90° orientation described in relation to FIG. 15) between the first body 502 and second body 504. In some embodiments, the third body 544 is repositioned on a back surface 546 of the first body 502, providing a tablet configuration for the electronic device.

When the third body 544 is in the laptop configuration (illustrated and described in relation to FIG. 14), the hinge 500 has a first stable closure mode where each of the pivot points 506, 508 are active during the closure to the clamshell configuration. When the third body 544 is not in the laptop configuration (e.g., removed from the first body 502 and/or repositioned to a different location on the first body 502 as illustrated and described in relation to FIG. 16) the hinge 500 has a second stable closure mode where the first pivot point 506 only is active, and the first pivot point 506 has a larger range of motion.

Figure 17:
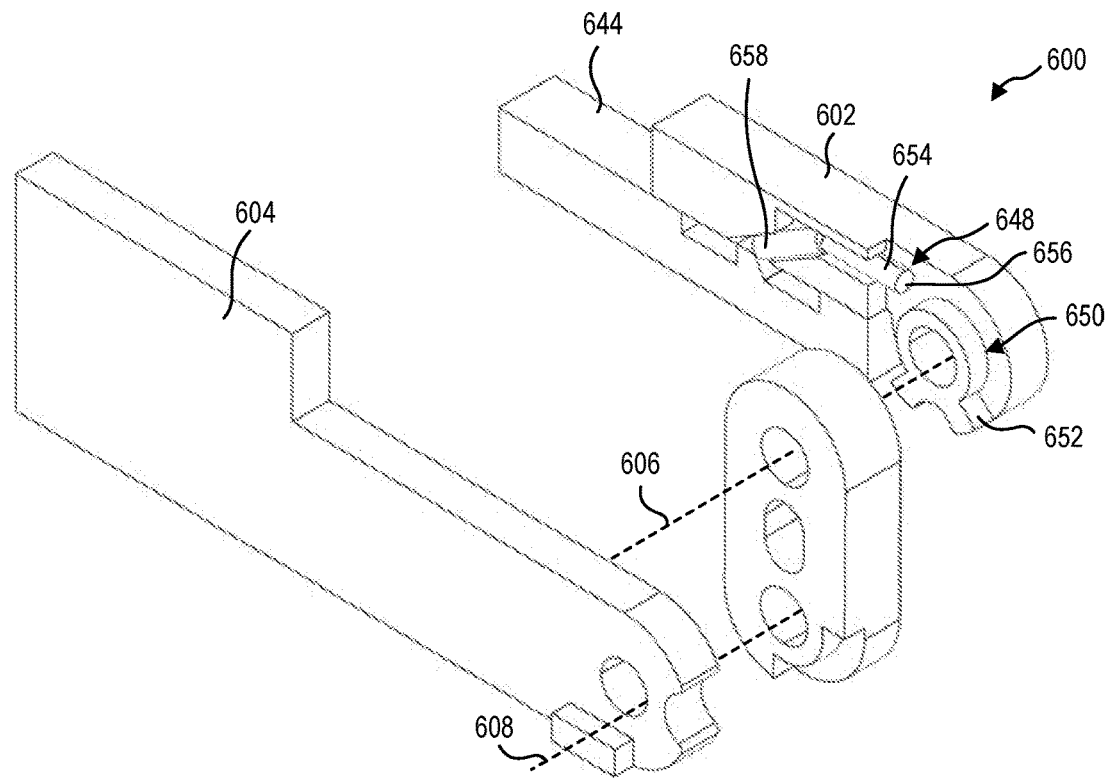
FIG. 17 is an exploded perspective view of a hinge with a locking mechanism, according to at least one embodiment of the present disclosure.

FIG. 17 through FIG. 21 provide various exemplary embodiments of mechanisms to limit the rotation of the first pivot point and transition the hinge between a first stable closure mode and a second stable closure mode. FIG. 17 is a perspective view of an embodiment of a hinge 600 including a locking mechanism 648. In some embodiments, a first pivot point 606 includes a locking mechanism 648. In other embodiments, a second pivot point 608 includes a locking mechanism 648. In yet other embodiments, both the first pivot point 606 and the second pivot point 608 include locking mechanisms 648. The embodiment illustrated in FIG. 17 includes a locking mechanism 648 on the first pivot point 606 that selectively limits the rotational range of motion of the first pivot point 606 (e.g., the rotation of the first body 602 relative to the link 610).

The hinge 600 includes an arcuate track 650 positioned in the first body 602 that engages with the link 610 to determine the rotational range of motion of the first body 602 relative to the link 610 in the hinge 600. The track 650 terminates in endwalls 652 at either end of the track 650 around the first pivot point 606. In some embodiments, the track 650 is positioned at least 135° around the first pivot point 606. In other embodiments, the track 650 is positioned at least 180° around the first pivot point 606. In yet other embodiments, the track 650 is positioned at least 225° around the first pivot point 606. In further embodiments, the track 650 is positioned at least 270° around the first pivot point 606. The first body 602 is rotatable around the first pivot point 606 relative to the link 610 until a portion of the link 610 contacts the endwall 652 of the track 650 preventing further rotation of the first body 602.

The locking mechanism 648 includes a pin 654 that is moveable relative to the first body 602 to selectively enter the track 650. When the pin 654 enters the track 650, the pin 654 limits the rotational range of motion of the first body 602 relative to the link 610 by effectively shortening with the track 650. A pin end 656 can interfere with the motion of a portion of the link 610 relative to the first body 602.

In some embodiments, when the pin 654 is inserted into the track 650, the pin 654 limits the rotational range of motion of the first body 602 relative to the link 610 to 45°. In other embodiments, when the pin 654 is inserted into the track 650, the pin 654 limits the rotational range of motion of the first body 602 relative to the link 610 to 60°. In yet other embodiments, when the pin 654 is inserted into the track 650, the pin 654 limits the rotational range of motion of the first body 602 relative to the link 610 to 90°. In at least one example, the first pivot point 606 has a rotational range of motion when the pin is retracted (e.g., not in the track 650) of 135° and a rotational range of motion of 45° when the pin is inserted.

In some embodiments, the pin 654 is movable relative to the first body 602 based upon the location and/or position of the third body 644 relative to the first body 602. For example, when the third body 644 is positioned in the laptop configuration, as shown in FIG. 17 (and as described in relation to FIGS. 14 and 15), the third body 644 physically contacts a mechanical linkage 658 of the first body 602 that applies a force to the pin 654 to move the pin 654 into the track 650. Therefore, when the third body 644 is positioned in the laptop configuration, the rotational range of motion of the hinge 600 around the first pivot point 606 is limited and causes the closure of the first body to rotate the link 610 around the second pivot point 608.

Figure 18:
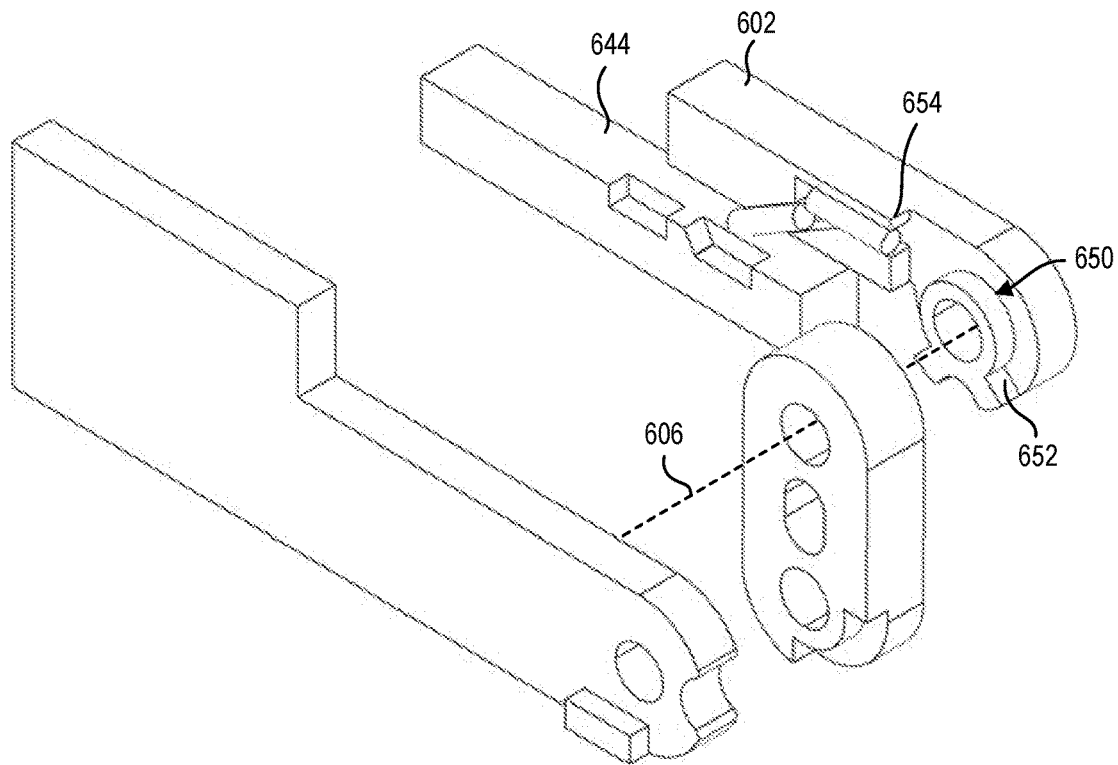
FIG. 18 is an exploded perspective view of the hinge of FIG. 17 with the locking mechanism in a retracted position.

Referring now to FIG. 18 and in contrast to FIG. 17, when the third body 644 is not in the laptop configuration relative to the first body 602 (e.g., removed to be used as a tablet or rotated away from the second body to be nested in the tablet configuration described in relation to FIG. 16), the force on the linkage 658 is removed and the pin 654 is free to move toward a retracted position away from the track 650. When the pin 654 is in the retracted position, the rotational range of motion of the first pivot point 606 is limited by the endwalls 652 of the track 650 and not by contact with the pin 654.

Figure 19:
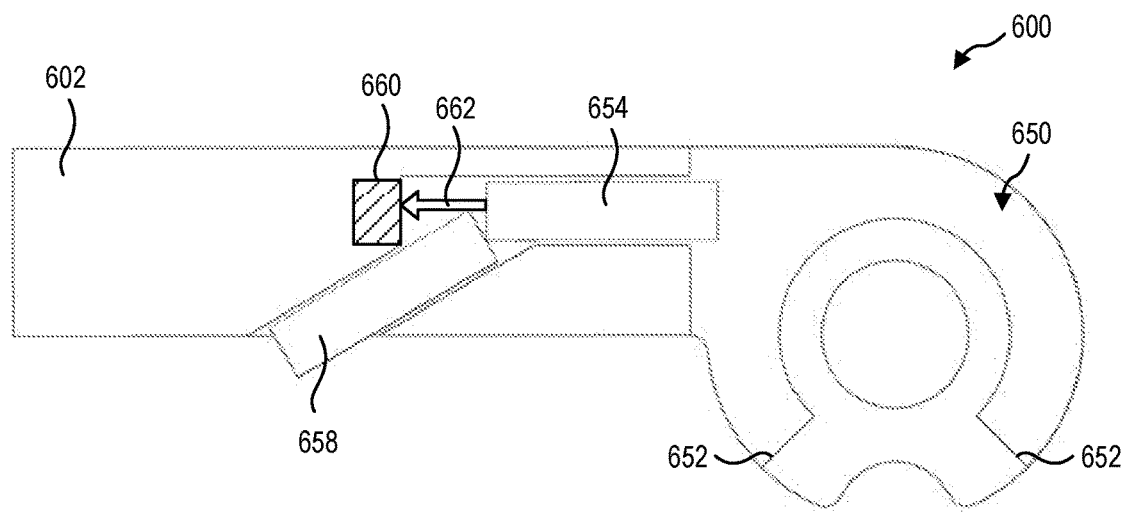
FIG. 19 is a side view of the locking mechanism of FIG. 17, according to at least one embodiment of the present disclosure.

FIG. 19 is a side view of the first body 602 of FIG. 18 with the pin 654 in the retracted position. In some embodiments, the pin 654 is biased toward the retracted position. For example, FIG. 19 illustrates a magnet 660 positioned on the opposite side of the pin 654 from the track 650. The pin 654 may include a magnetic or ferromagnetic material such that the magnet 660 applies an attractive force 662 to the pin 654 to bias the pin 654 toward the magnet 660. When the mechanical linkage 658 or other mechanism removes a countering force from the pin 654, the attractive force 662 may move the pin 654. The pin 654, when the mechanical linkage 658 or other biasing mechanism is not in contact with the third body, therefore, may move toward the retracted position. In at least one embodiment, a magnet is positioned in the third body to apply a force to the pin 654 to move the pin when the third body is in the laptop configuration.

In other embodiments, the pin 654 is biased toward the retracted position by other biasing mechanisms. For example, the biasing mechanism may be an elastically deformable member coupled to the pin 654 (or an elastically deformable portion of the pin 654) and the first body 602 that pulls the pin 654 toward the retracted position. In some examples, the biasing mechanism is a spring such as a coil spring or a leaf spring. In other examples, the biasing mechanism is an elastic polymer. In yet other examples, the biasing mechanism is a combination of such elements, such as a coil spring and a magnet.

In other embodiments, the hinge 600 may lack a biasing element that passively biases the pin 654 toward the retracted position and, rather (or additionally) includes an actuatable movement device that is actuated by the position of the third body. For example, the pin 654 may be movable between the retracted position and the inserted position (i.e., inserted into the track 650) by electromagnetic actuation. The magnet 660 may be an electromagnet that selectively applies an attractive force 662 or an opposing repulsive force to move the pin 654. When the third body is positioned in the laptop configuration, the electromagnet applies a repulsive force to move the pin 654 into the track 650, limiting the rotational range of motion of the first body 602. When the third body is moved away from the laptop configuration, the electromagnet applies an attractive force 662, allowing the larger rotational range of motion between the endwalls 652 of the track 650.

In other embodiments, the actuatable movement device that moves the pin 654 is an electric motor. For example, the electric motor may be a linear actuator motor. In other examples, the electric motor may be a screw motor. While the embodiment described in relation to FIG. 18 and FIG. 19 uses a mechanical linkage 658, an actuatable movement device is actuated by other devices. In some embodiments, an actuatable movement device is in data communication with a pressure switch. The pressure switch may detect the presence or position of the third body relative to the first body 602 to selectively actuate the actuatable movement device when the third body is in the laptop configuration, the tablet configuration, or other position. In at least one embodiment, the actuatable movement device is actuated by a computerized control. For example, the actuatable movement device can be in data communication with a processor in the first body, second body, or third body, that allows the actuatable movement device to be selectively actuated through software and/or firmware of an electronic device.

Figure 20:
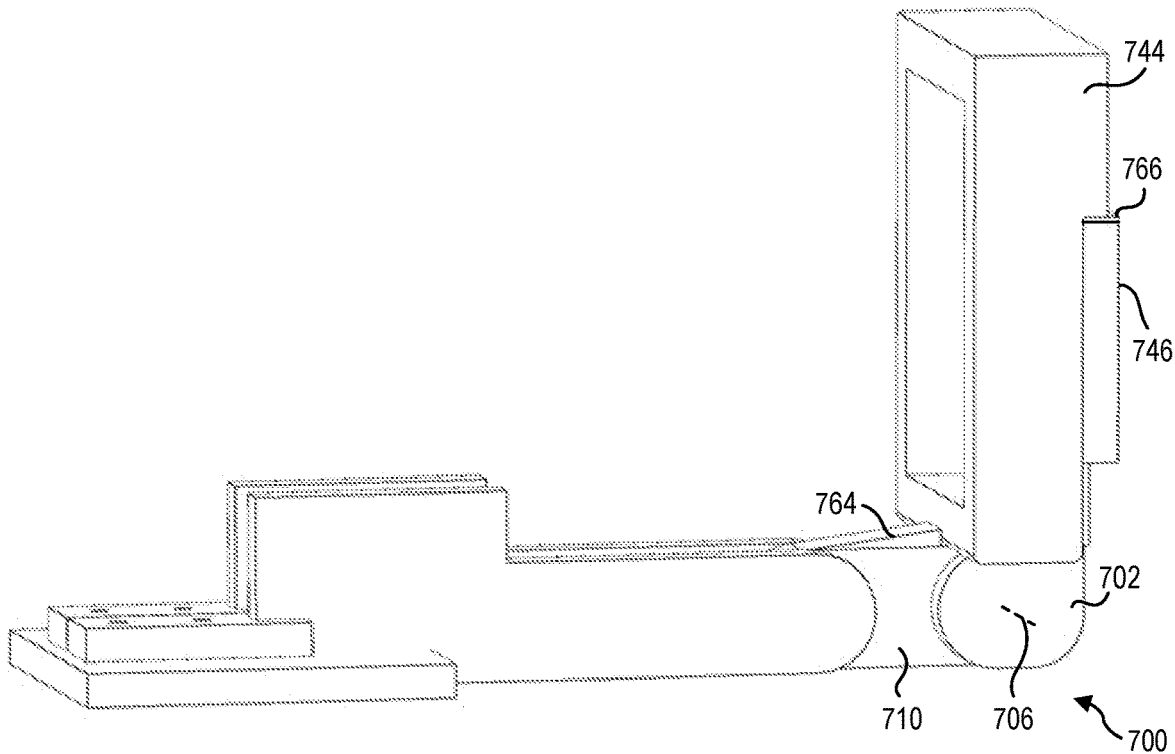
FIG. 20 is a perspective view of an electronic device with a hinge including a hardstop, according to at least one embodiment of the present disclosure.

Referring now to FIG. 20, in some embodiments, a hinge 700 includes a mechanical hardstop 764 on the third body 744 and/or the link 710 to limit the rotational range of motion around the first pivot point 706 when the third body 744 is in a laptop configuration. When the third body 744 is not in the laptop configuration, the hardstop on the third body 744 and/or the link 710 does not contact and limit the rotational range of motion, allowing a larger rotational range of motion around the first pivot point 706.

In some embodiments, the first body 702 and third body 744 are rotatably coupled to one another with a polymeric flap 766. The polymeric flap 766 allows the third body 744 to hinge relative to the first body 702 and flip to a back surface 746 of the first body 702. In other embodiments, the first body 702 and third body 744 are rotatably coupled by a hinge, such as a piano hinge.

FIG. 20 illustrates an embodiment of a hinge 700 with a hardstop 764 positioned on the link 710. The hardstop 764 contacts the third body 744 when the third body 744 is in the laptop configuration (illustrated in FIG. 20) and when the first body 702 is positioned at a 90° angle relative to the link 710. When the third body 744 is rotated around the polymeric flap 766 toward the back surface 746 of the first body 702, the first body 702 can rotate beyond a 90° orientation relative to the link 710 and approach a 0° orientation relative to the link 710.

Figure 21:
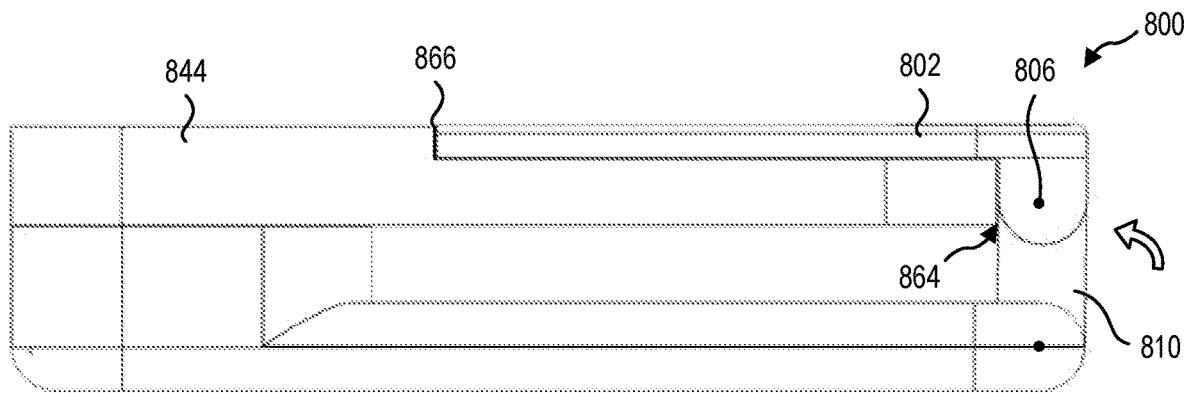
FIG. 21 is a perspective view of another electronic device with a third body including a hardstop, according to at least one embodiment of the present disclosure.

FIG. 21 illustrates an embodiment of a hinge 800 with a hardstop 864 positioned on the third body 844. The hardstop 864 contacts the link 810 when the third body 844 is in the laptop configuration (illustrated in FIG. 21) and when the first body 802 is positioned at a 90° angle relative to the link 810. When the third body 844 is rotated around the polymeric flap 866, the first body 802 can rotate beyond a 90° orientation relative to the link 810 and approach a 0° orientation relative to the link 810 (such as illustrated in FIG. 16) and lie in plane with the second body 806.

Figure 22:
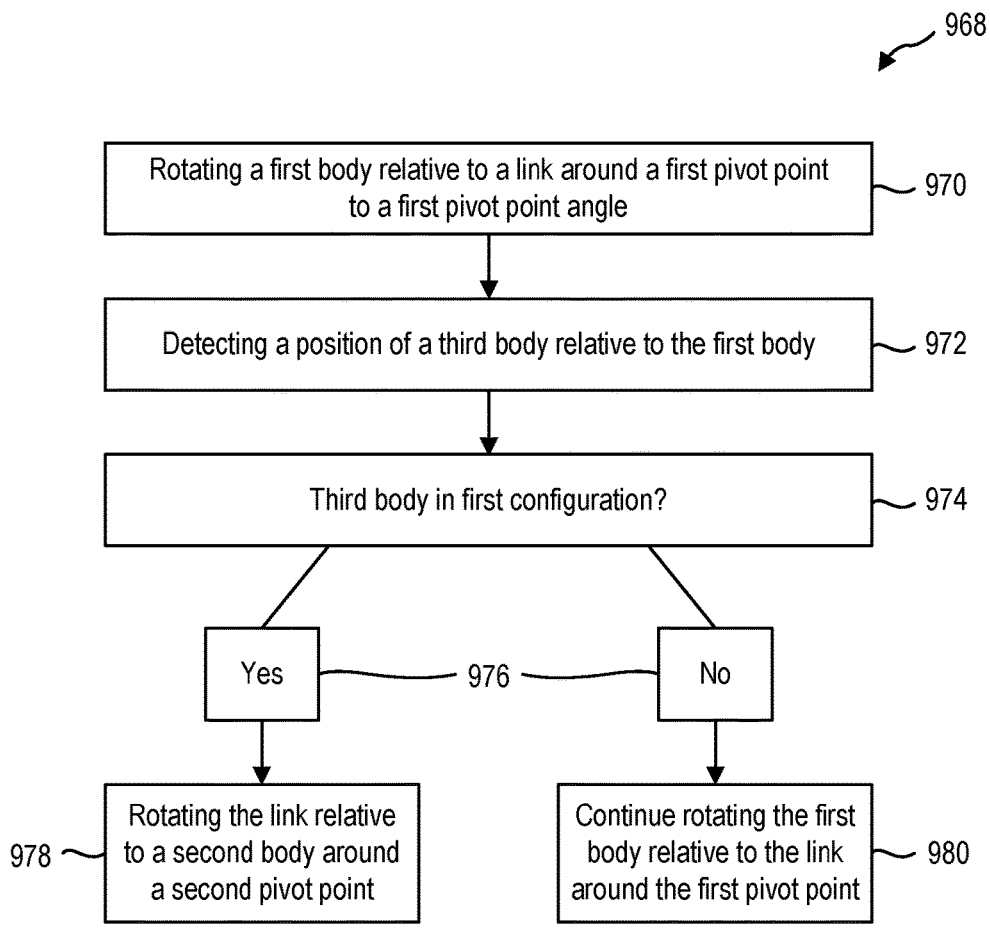
FIG. 22 is a method of closing a hinged electronic device, according to at least one embodiment of the present disclosure.

FIG. 22 is a flowchart illustrating a method 968 of moving a hinge between an open configuration and a plurality of closed configurations. The hinge has a plurality of pivot points, which can each be active at different times and/or positions within the rotation of the hinge. For example, the hinge has a first body and a second body that are rotatable about a first pivot point and a second pivot point, respectively. The first body and the second body are connected by a link positioned therebetween, where the first body is rotatable relative to the link around the first pivot point and the second body is rotatable relative to the link around the second pivot point.

The method 968 includes rotating the first body relative to the link around the first pivot point to a first pivot point angle between the first body and the link at 970. For example, the first pivot point angle may be 90°. In some embodiments, the first pivot point is active while rotating the first body relative to the second body, and the second pivot point is inactive. In some examples, the inactive second pivot point is locked by a follower or other locking mechanism that mechanically interferes with the rotation of the link and second body relative to one another (such as described in relation to FIG. 5 through FIG. 8). In other examples, the first pivot point has a first rotational resistance and the second pivot point has a second rotational resistance, where the second rotational resistance is greater than the first rotational resistance. A force applied to move the first body relative to the second body will, due to the difference is rotational resistances, preferentially rotate the hinge around the first pivot point relative to the second pivot point (such as described in relation to FIG. 9 through FIG. 13).

The method 968 further includes detecting a position of a third body relative to the first body at 972. In some embodiments, detecting the position of the third body includes contacting a portion of a locking mechanism of the first body with the third body (such as described in relation to FIG. 17 and FIG. 18). In other embodiments, detecting the position of the third body includes contacting a pressure switch of the first body with the third body. In yet other embodiments, detecting the position of the third body includes reading an electronic file with a microprocessor in data communication with the locking mechanism. In further embodiments, detecting the position of the third body includes contacting a portion of the link with the third body. In some embodiments, the link has a hardstop that selectively engages the third body (such as described in relation to FIG. 20). In other examples, the third body has a hardstop that selectively engages the link (such as described in relation to FIG. 21).

The method 968 further includes checking whether the third body is in a first configuration at 974 after detecting the position of the third body relative the first body at 972. In some embodiments, the first configuration is a laptop configuration of an electronic device. For example, the third body can include a display and the second body can include a keyboard or other human interface device. When the display is positioned on the first body such that the display is oriented toward the keyboard (such as illustrated in FIG. 1), the first body may be in a laptop configuration. When the display is not positioned in the laptop configuration, the third body may be disconnected from the first body (such as described in relation to FIG. 18) or repositioned on the first body at a different orientation or location (such as described in relation to FIG. 16). In other embodiments, the first configuration is another configuration of the first body and the third body.

After the decision outcome at 976, the hinge may continue rotating the first body toward the second body in one of a plurality of rotational modes. When the decision outcome confirms the third body is in the first configuration (e.g., "yes" in the decision outcome at 976), the first pivot point becomes inactive and the hinge begins rotating the link relative to the second body around the second pivot point at 978 (such as described in relation to FIG. 12 and FIG. 13). When the decision outcome does not confirm the third body is in the first configuration (e.g., "no" in the decision outcome at 976), the first pivot point remains active and the hinge continues rotating the first body relative to the link around the first pivot point at 980 (such as described in relation to FIG. 12 and FIG. 13). The first pivot point remains active with a larger rotational range of motion than the "yes" decision outcome.

In at least one embodiment of the present disclosure, a hinge has a plurality of stable positions that are achieved through different active pivot points during the rotation of the hinge. The hinge allows an electronic device or other device to arrange a first body and a second body of the device differently depending on how the hinge opens and closes. The hinge can allow multiple operational modes of the device by positioning the first body and second body relative to one another depending on the configuration of a third body relative to the first body.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A hinge system for bistable motion, the hinge system comprising:
    a first body;
    a second body;
    a link, where the link is rotatable relative to the first body around a first pivot point and rotatable relative to the second body around a second pivot point, where the first pivot point has a first rotational resistance and the second pivot point has a second rotational resistance that is different from the first rotational resistance; and
    a third body selectively positionable relative to the first body in a first stable closed configuration and a second stable closed configuration, the third body limiting a first rotational range of motion around the first pivot point when positioned in the first stable closed configuration, wherein the link is positioned in line with the second body to lie in plane with the second body in the second stable closed configuration and out of line with the second body to lie out of plane with the second body in the first stable closed configuration.

2. The hinge system of claim 1, further comprising a one-way bearing at the first pivot point that provides the first rotational resistance around the first pivot point in a first rotational direction and a third rotational resistance around the first pivot point in a second rotational direction, where the first rotational resistance is different from the third rotational resistance.

3. The hinge system of claim 2, the first rotational resistance being less than the second rotational resistance, and the second rotational resistance being less than the third rotational resistance.

4. The hinge system of claim 1, the first body including a locking mechanism with a pin that is movable between an inserted position and a retracted position, the inserted position limiting a first rotational range of motion of the link and the first body around the first pivot point.

5. The hinge system of claim 4, the pin being in the inserted position when the third body is in a laptop configuration.

6. The hinge system of claim 4, the locking mechanism including a mechanical linkage that moves the pin when the third body contacts the mechanical linkage.

7. The hinge system of claim 4, the locking mechanism including a biasing mechanism that biases the pin toward the retracted position.

8. The hinge system of claim 4, the locking mechanism including an actuatable movement device to selectively actuate a movement of the pin between the retracted position and the inserted position.

9. The hinge system of claim 1 further comprising a hardstop between the link and the third body that mechanically limits the first rotational range of motion when the third body is in the first stable closed configuration.

10. The hinge system of claim 1 further comprising:
    a means for selectively limiting a first rotational range of motion of the first pivot point based upon a position of the third body relative to the first body.

11. The hinge system of claim 10, the first pivot point having a first rotational range of motion greater than 90° of rotation about the first pivot point when the third body is not connected to the second body.

12. The hinge system of claim 10, the means for selectively limiting the first rotational range of motion limiting rotation about the first pivot point to 90° or less when the third body is connected to the second body.

13. The hinge system of claim 10, a second rotational range of motion of the second pivot point being at least 90°.

14. The hinge system of claim 10, the third body being rotatably coupled to the first body to rotate between the first stable closed configuration and the second stable closed configuration proximate a back surface of the first body.

15. The hinge system of claim 1, wherein the first pivot point between the link and the first body includes a rotational resistance greater than the second pivot point between the link and the second body.

16. The hinge system of claim 1, wherein the first pivot point only is active when hinge system is moved from the second stable closed configuration.

17. The hinge system of claim 1, wherein the first pivot point has a larger range of motion when the hinge system is moved from the second stable closed configuration than when the hinge system is moved from the first stable closed configuration.

18. The hinge system of claim 1, further comprising a locking mechanism in the hinge to limit a rotational range of motion of the first pivot point configured to force any further rotation to occur around the second pivot point based upon a position of the third body relative to the first body.

19. The hinge system of claim 18, wherein the locking mechanism includes a pin that is moveable relative to the first body to selectively enter a track positioned in the first body based upon a position of the third body relative to the first body.

* * * * *